United States Patent [19]
Hensinger et al.

[11] Patent Number: 5,592,985
[45] Date of Patent: Jan. 14, 1997

[54] METHOD OF AND AN APPARATUS FOR APPLYING HARD MATERIAL TO CUTTING TOOL TEETH, ESPECIALLY THE TEETH OF SAW BLADES

[75] Inventors: Bruno Hensinger, Laupheim-Obersulmetingen; Werner Reichenzer, Warthausen, both of Germany

[73] Assignee: Vollmer Werke Machinenfabrik GmbH, Biberach/Riss., Germany

[21] Appl. No.: 351,390

[22] PCT Filed: Apr. 25, 1994

[86] PCT No.: PCT/EP94/01284

§ 371 Date: Dec. 9, 1994

§ 102(e) Date: Dec. 9, 1994

[87] PCT Pub. No.: WO94/25203

PCT Pub. Date: Nov. 10, 1994

[30] Foreign Application Priority Data

May 4, 1993 [DE] Germany ............... 43 14 707.0

[51] Int. Cl.⁶ ................. B22D 19/08; B22D 27/09
[52] U.S. Cl. ................. 164/98; 164/332; 164/120
[58] Field of Search ............ 164/98, 120, 319, 164/332, 122

[56] References Cited

U.S. PATENT DOCUMENTS 5,101,879  4/1992  Beck et al. .................. 164/98

FOREIGN PATENT DOCUMENTS

412474-A1  1/1993  Germany .................. 164/98

Primary Examiner—Joseph J. Hail, III
Assistant Examiner—I.-H. Lin
Attorney, Agent, or Firm—Clifford W. Browning; Woodard, Emhardt, Naughton, Moriarty & McNett

[57] ABSTRACT

A method of and an apparatus for applying hard material to cutting tool teeth (12), especially the teeth of saw blades (10). Due to its surface tension, the molten material (56) forms a spherical segment (58) in a mold cavity (40) which is defined around a tooth (12). The molten material (56) is cooled in the mold cavity (40) and subsequently heated again until it reaches a state which is at least approximately liquid. Only then is pressure, progressing in the direction towards the tip (18) of the tooth, applied to the spherical segment (58), whereby the latter is flattened. Hereby the precision in shape and durability of the teeth (12) is improved which are made of hard material (56), first molten and subsequently solidified.

3 Claims, 5 Drawing Sheets

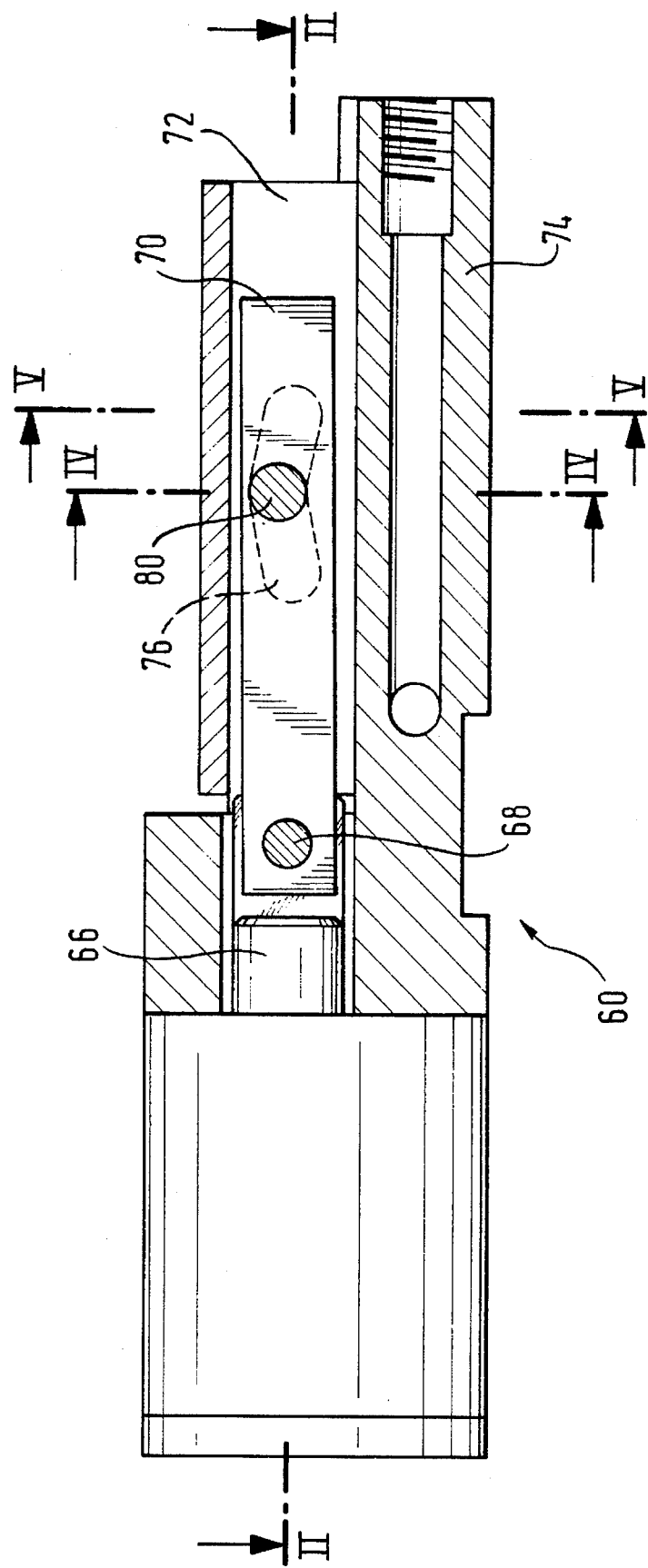

METHOD OF AND AN APPARATUS FOR APPLYING HARD MATERIAL TO CUTTING TOOL TEETH, ESPECIALLY THE TEETH OF SAW BLADES

BACKGROUND OF THE INVENTION

The invention relates to a method of applying hard material to cutting tool teeth, especially the teeth of saw blades, wherein a mold cavity is defined around a tooth and the molten material forms a spherical segment therein, due to its surface tension, and the spherical segment is flattened under pressure which is applied progressively in the direction of the tip of the tooth.

The invention also relates to an apparatus for carrying out such a method, comprising mold jaws adapted to be engaged with a tooth and a pressing tool for exerting pressure on the spherical segment formed of the molten material.

SUMMARY OF THE INVENTION

A method and an apparatus of this kind are known from EP 0 374 950 A2. In that case provision is made for the pressure which progresses in the direction towards the tip of the tooth to be applied to the spherical segment, for instance, by a ram which is lowered to the spherical segment with a component of movement towards the tip of the tooth. Alternatively, a gas or plasma jet having been used to melt the: hard material may be moved over the spherical segment in the direction of the tip of the tooth, or the molten material may be forced away by a gas jet directed along the back of the tooth towards the tip of the tooth. As a result of these measures the mold cavity will be filled completely with molten material, and no great excess of material is required which, later on, only would have to be removed by grinding.

It is the object of the invention to provide further improvement in the accuracy of shape and durability of the teeth made of molten and subsequently solidified hard material. Starting from a method of the kind specified initially, this object is met, in accordance with the invention, inasmuch as the method is concerned, by the fact that, prior to applying pressure on the spherical segment, the molten material is cooled and subsequently heated again until a state is reached which is at least approximately liquid.

The invention is based on the finding that it is particularly favorable for precision in shape and durability of teeth or tooth parts having been applied by melting on to a basic body of a cutting tool, especially a saw blade, if the molten hard material first is left alone, in other words, if it is accepted that it solidifies more or less completely with a free surface having the shape of a spherical segment. When, for example, Stellite is used, that is achieved by allowing the molten material to cool down from its melting point at approximately 1200° to 1300° C. to from about 800° to 700° C. That takes from about 3 to 5 seconds, depending on the size of Stellite formation. During the subsequent heating, the melting point need not be reached again. Preferably, however, the material applied is heated beyond a doughy state before applying the pressure to flatten the spherical segment.

Allowing the hard material applied to a cutting tool to cool and then heating it once more, above all, counteracts the tendency of the material to form voids. This unexpected effect, not yet fully explained so far, which was observed and confirmed in numerous tests brings about a marked improvement in cutting performance of tools treated in accordance with the invention. That is true in particular of saw blades with which the frequent occurrence up to now of voids may result in considerable weakening of the relatively narrow teeth which, therefore, tend to crumble.

The means used for reheating the material are not of critical importance; the energy required for renewed heating may be supplied just like the energy needed for the original melting, for instance, electroinductively or by a gas or plasma burner. It proved to be especially advantageous to use one and the same plasma burner for both purposes; it is switched off for the time interval mentioned of, for example, from 2 to 5 seconds, following the original melting, and then ignited once more.

In terms of the apparatus, the mechanical aspect of the above mentioned problem is solved, starting from an apparatus of the kind specified initially, by the fact that the pressing tool is a plate which is movable at least approximately parallel to itself in the direction of the tip of the tooth, and beyond the same, along an arcuate path which is concave as seen from the spherical segment.

Advantageous further developments of the invention may be gathered from the subclaims.

BRIEF DESCRIPTION OF THE DRAWINGS

An embodiment of the invention will be described in greater detail below, with reference to diagrammatic drawings, in which:

FIG. 3 is an enlarged cutout of FIG. 1, shown partly as section III—III of FIG. 2;

DESCRIPTION OF THE PREFERRED EMBODIMENT

Figure 1:
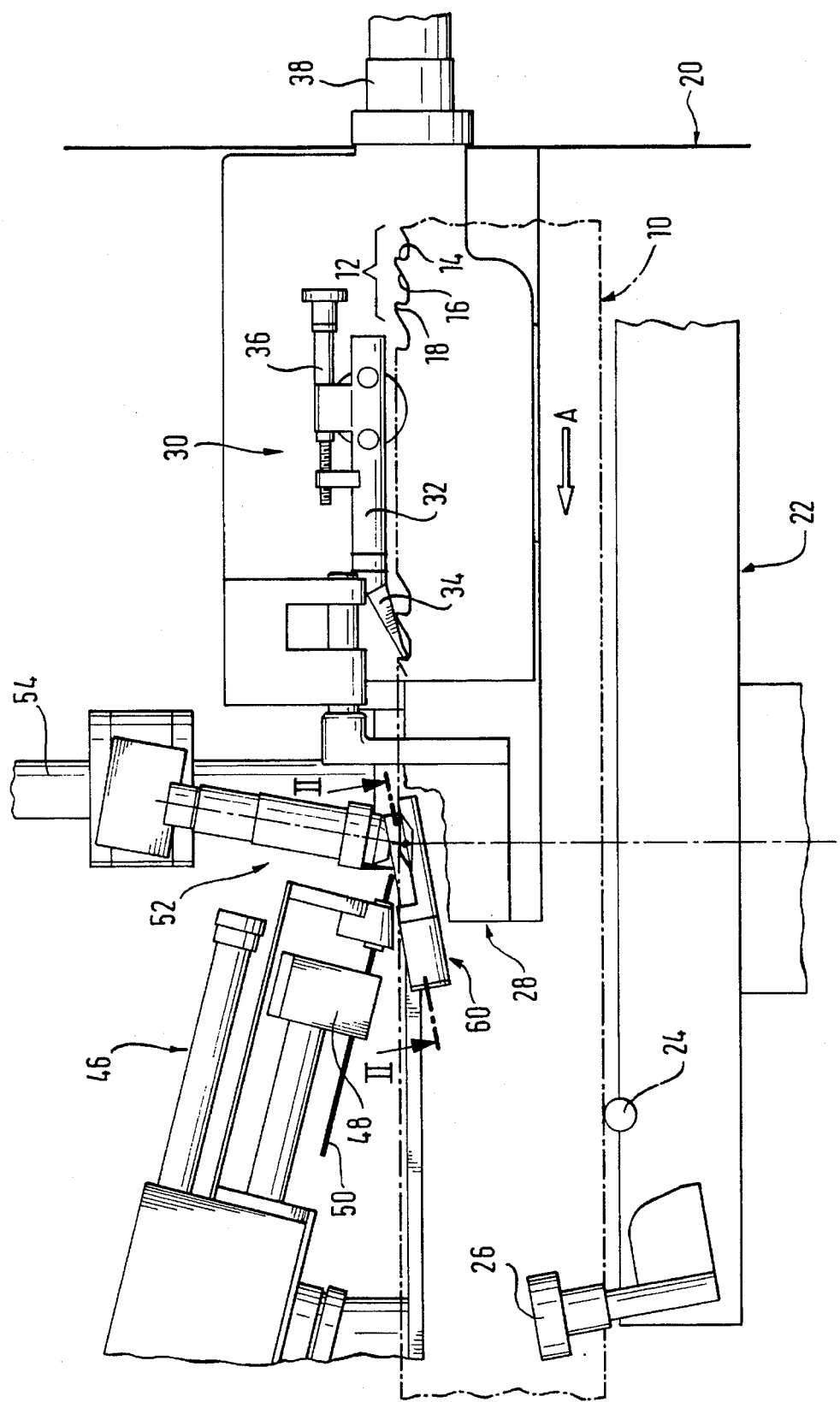
FIG. 1 is a front elevation of an apparatus for applying Stellite to sawteeth.
Figure 2:
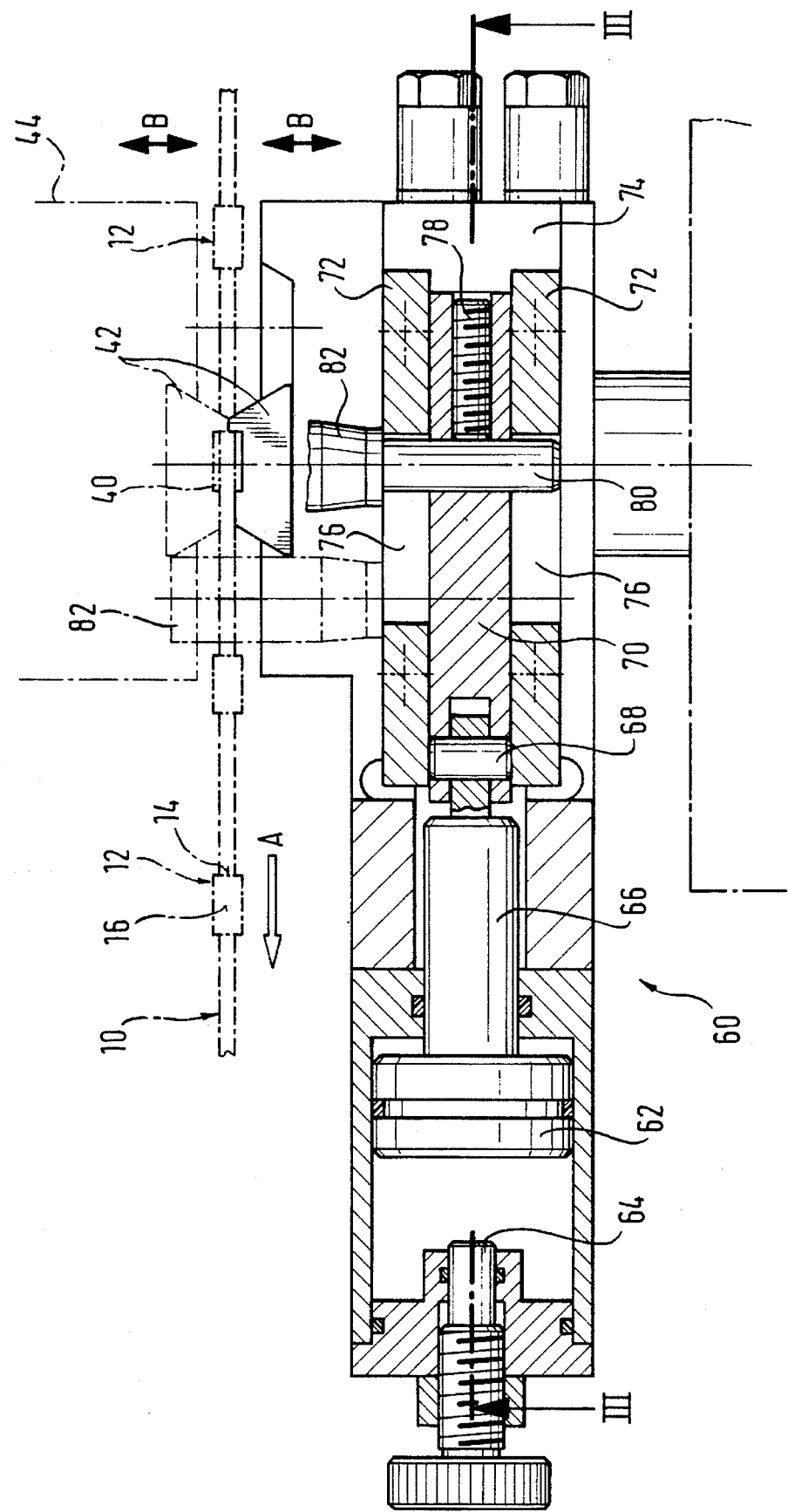
FIG. 2 shows section II—II of FIG. 1.
Figure 5:
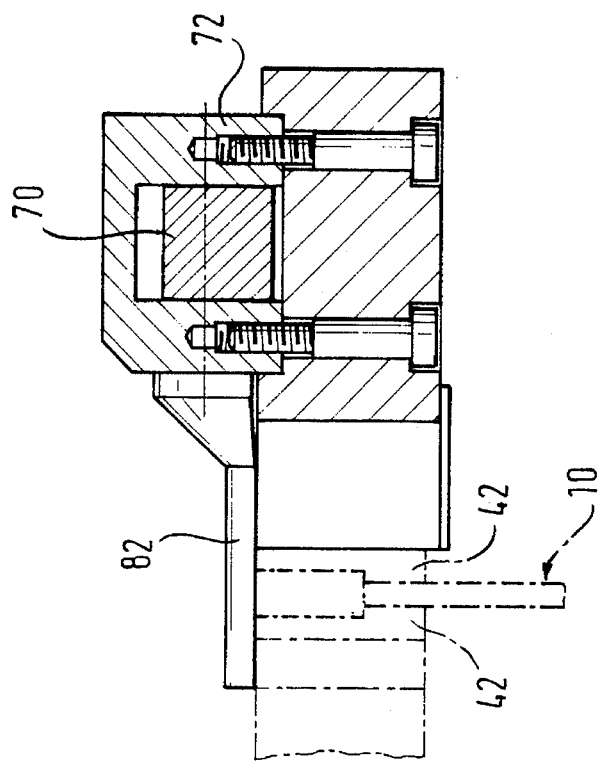
FIG. 5 shows cross section V—V of FIG. 3.
Figure 4:
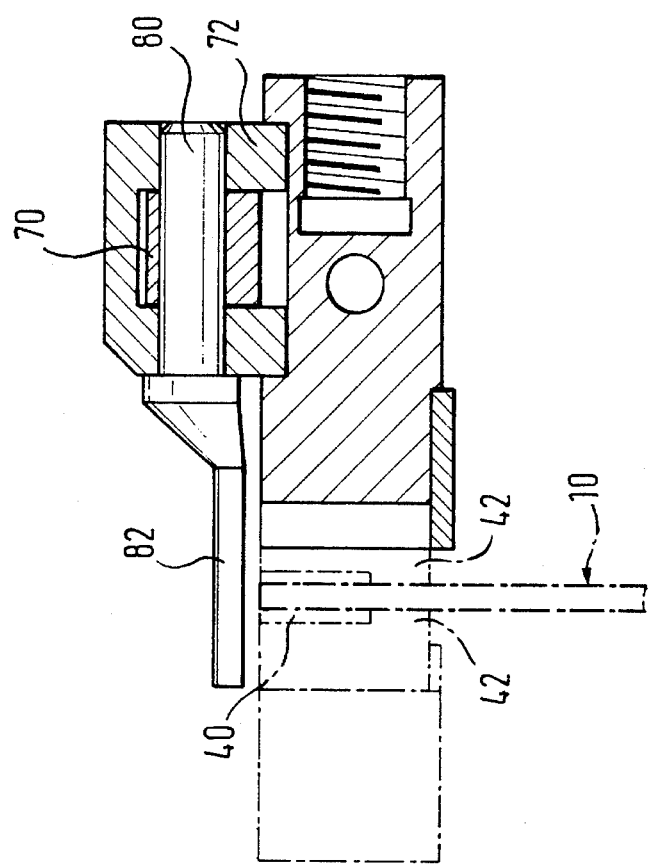
FIG. 4 shows cross section IV—IV of FIG. 3.

The apparatus illustrated serves to apply Stellite to teeth 12 which were previously formed, e.g. by punching, on saw blades 10, and the respective face 14, back 16, and tip 18 of which are to be formed by a Stellite coat. FIGS. 1 and 2 indicate a saw blade 10 for a band saw; the apparatus also may be changed over to the application of Stellite to saw blades for frame saws or saw blades for circular saws. The apparatus comprises a box-like frame 20 with a saw blade guide means 22 of conventional structure, including support rollers 24 and hold-down rollers 26, as well as a clamping means 28 and a feeder means 30, likewise of conventional structure, disposed at the front of the apparatus facing the onlooker of FIG. 1. In the example shown, the feeder means 30 comprises a carriage 32 which is reciprocable in longitudinal direction of the saw blade 10 and equipped with a pivotable pawl 34 for engagement behind a tooth face 14 during each operating cycle so as to advance the saw blade 10 in stepwise motion in the direction of arrow A in FIGS. 1 and 2 by one or more tooth pitches. The carriage 32 is connected by a threaded spindle 36, permitting longitudinal adjustment, to the piston rod of a piston and cylinder unit 38.

During each working cycle, a tooth 12 of the saw blade 10 is moved into a mold cavity 40 defined by two mold jaws 42 which are symmetrical to the plane of the saw blade. They are mounted on a mold closing means 44 of conventional structure and moved into tight engagement with the saw blade 10 from one side each when the saw blade 10 has come to a standstill and the clamping means 28 has been closed.

A supply means 46, likewise of conventional structure, and comprising a gripper 48 for intermittently advancing a rod 50 of material is provided for the supply of Stellite (or another hard material). Whenever the saw blade 10 is stopped, the free end of the rod 50 of material is located vertically above the mold cavity 40 within the range of influence of a melting device 52 embodied, in the example shown, by a plasma burner and arranged adjustably on a column 54.

During each working cycle, molten material 56 drops from the heated free end of the rod 50 of material into the mold cavity 40 where it forms a spherical segment 58 at its free surface. A wiper means 60 is provided for flattening the spherical segment at least approximately parallel to and at a short distance from the intended course of the face 14 of the tooth. The wiper means 60 comprises an hydraulic or pneumatic piston and cylinder unit, including a piston 62 whose starting position is determined by an adjustable stop 64. FIG. 2 illustrates the piston 62 in its terminal position. At its end remote from the stop 64, the piston 62 has a piston rod 66 which extends towards the back, approximately contary to the direction of advance A of the saw blade 10, and is connected by a joint 68 to a carriage 70 which is reciprocable in parallel with the direction of advance A. The carriage 70 is guided between two plates 72 which are parallel to the saw blade 10 and vertical in the embodiment shown; they are received so as to be exchangeable in a retainer means 74 which is stationary on the frame 20 and each include an arcuate guide means 76. The two guide means 76 are embodied by coinciding slots, formed by milling or grinding, in the plates 72.

Figure 6:
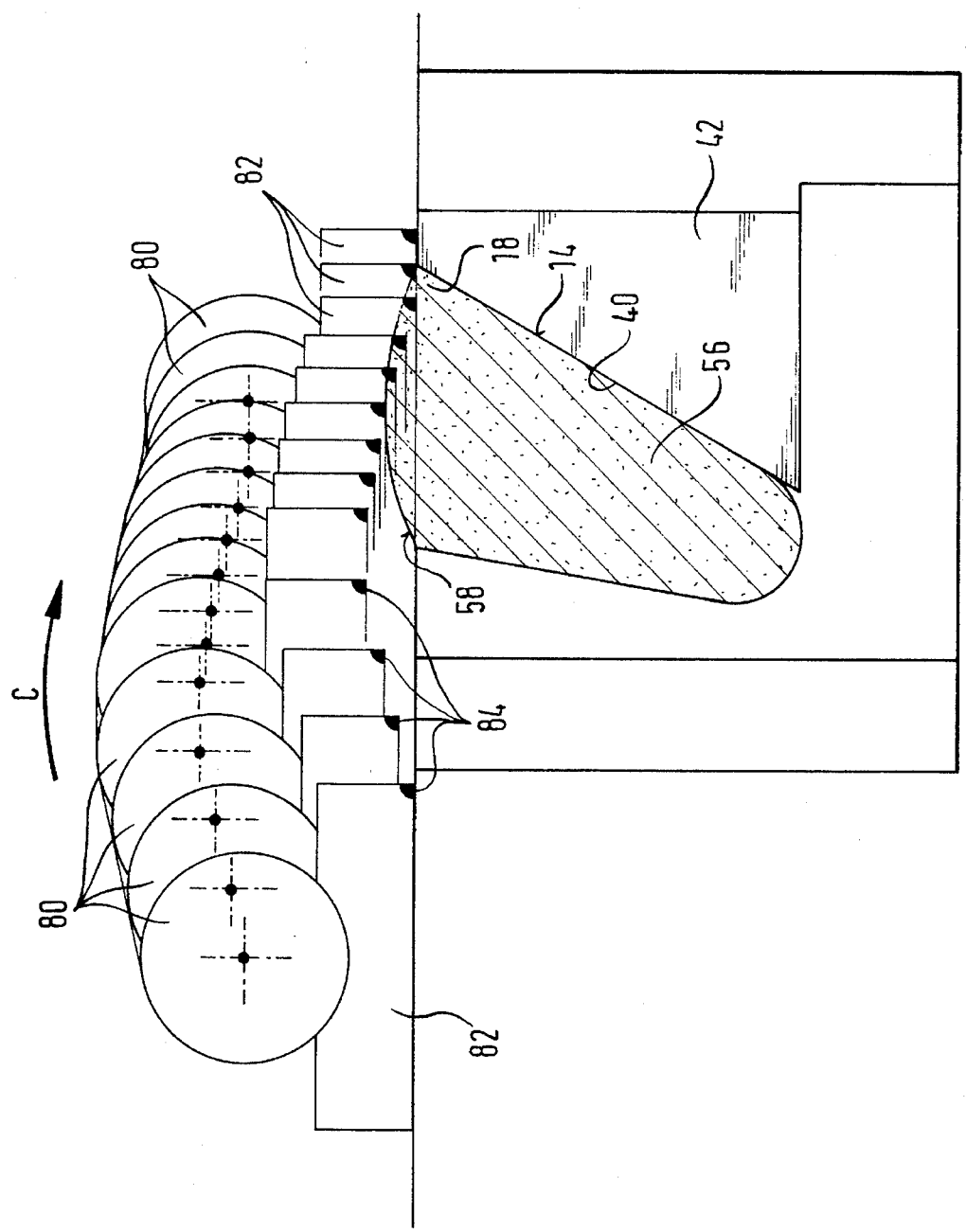
FIG. 6 illustrates the course of motion during the finishing of a sawtooth.

The carriage 70 has a bore which is formed at right angles to the plane of the saw blade 10 and is horizontal in the embodiment illustrated. In this bore, a cam follower 80 is fastened by means of a setscrew 78. In the embodiment shown, the latter is an annealed, ground, cylindrical bolt which passes through both guide means 76. A pressing tool 82 in the form of a plate is secured to one end of the cam follower 80. As the piston rod 66 is extended, the cam follower 80 rides along in the guide means 76, to the right in FIGS. 1 to 3 and 6, and the pressing tool 82 moves accordingly in the direction of arrow C in FIG. 6, following a path 84 which is concave when looking at it from below. This motion, of which FIG. 6 shows a plurality of successive stages, is steady and leads to the pressing tool 82 moving downwards gradually on to the spherical segment 58, beginning with its right end area, displacing the molten material 56 to the right, towards the tip 18 of the tooth, and wiping off excessive material.

Where the amount of material to be applied to each tooth 12 is small, as is the case, above all, with saw blades 10 having small teeth 12, the wiper means 60 may be started at once during each working cycle as soon as the mold cavity 40 has been filled with the required quantity of molten material 56. The same applies to bigger teeth if material is used which does not tend to form voids. As a rule, however, it is necessary, or at least convenient, to let the molten material 56 contained in the mold cavity 40 solidify without the action of a wiper means 60, thus letting it keep its spherical segment 58. This will take approximately from 3 to 5 seconds, with the usual cooling of the mold jaws 42. During this time, the melting device 52 is turned off or directed away from the mold cavity 40. It is only after the material 56 has solidified, that the melting device 52 is ignited again or directed towards the mold cavity 40 once more, in case it remained in operation. Therfore, the material 56 will melt again. Only then is the wiper means 60 set in operation so that the pressing tool 82 will carry out the movement described along the path 84.

What is claimed is:

1. A method of applying hard material to cutting tool teeth (12), including the teeth of saw blades (10), comprising the steps of defining a mold cavity (40) around a tooth (12);

introducing molten material (56) into said mold cavity, wherein due to its surface tension, the molten material forms a spherical segment (58);

cooling and subsequently reheating the molten material until it has reached a state which is at least approximately liquid; and then flattening the spherical segment (58) under pressure applied progressively in a direction towards the tip (18) of the tooth.

2. The method as claimed in claim 1, wherein the molten material (56) remains in the mold cavity (40) during said cooling and subsequent reheating step.

3. An apparatus for applying hard material to cutting tool teeth, including teeth of saw blades, comprising mold jaws (42) adapted for engagement with a tooth (12) and a pressing tool (82) to exert pressure on a spherical segment (58) of the molten material (56) introduced within said mold jaws, wherein the pressing tool (82) is a plate which is movable at least approximately parallel to itself in the direction of the tip (18) of the tooth, and beyond the same, along an arcuate path (84) which is concave as seen from the spherical segment (58), and wherein the pressing tool (82) is connected firmly to a cam follower (80) which is movable back and forth along an arcuate guide means (76).

* * * * *